Dec. 11, 1962     T. J. SAMBORSKI     3,068,363
DEVICE FOR ACCURATELY POSITIONING MACHINE TOOL COMPONENTS
Filed Feb. 17, 1961
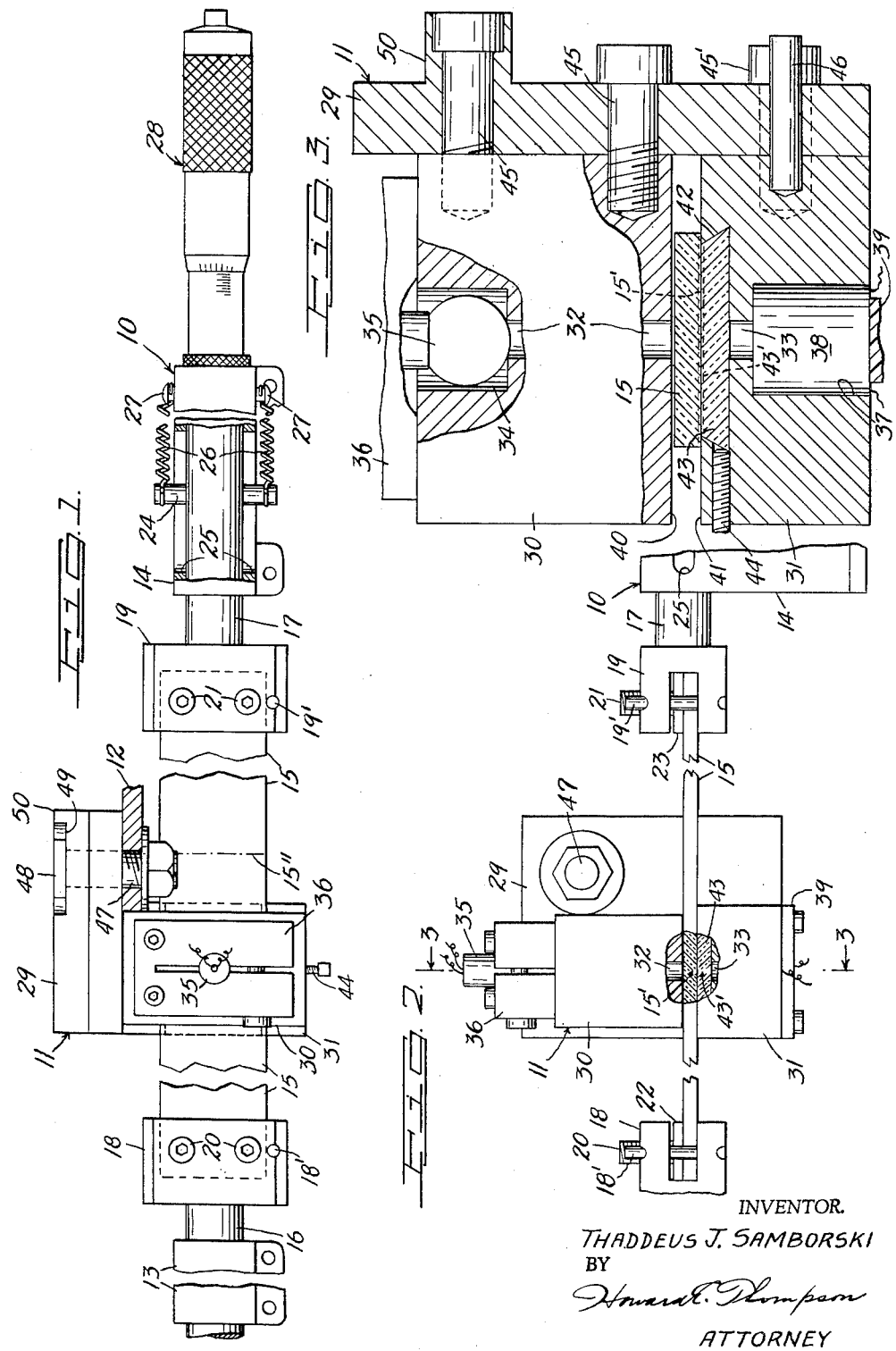
INVENTOR.
THADDEUS J. SAMBORSKI
BY
Howard E. Thompson
ATTORNEY

United States Patent Office 3,068,363
Patented Dec. 11, 1962

3,068,363
DEVICE FOR ACCURATELY POSITIONING
MACHINE TOOL COMPONENTS
Thaddeus J. Samborski, U.S. Highway 46, R.D.,
Hackettstown, N.J.
Filed Feb. 17, 1961, Ser. No. 90,135
10 Claims. (Cl. 250—234)

This invention relates to devices for use in conjunction with various types and kinds of machines for definitely measuring and/or positioning distances, as, for example, in the positioning of a tool with respect to different positions or stations of the workpiece being operated upon. More particularly, the invention deals in a simple form of device comprising two units, one of which is fixed and the other is moved relatively to the fixed unit in bringing spaced markings on a control element in one unit in registering position with a marked panel supported in the companion unit in controlling actuation of a photocell in performance of any predetermined operation.

Still more particularly, the invention deals in a device of the character described, wherein the unit supporting the control element includes a slide actuated through the medium of a micrometer in controlling positioning of the element in said unit.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic plan view of a device made according to my invention, with parts of the construction broken away and parts in section and illustrating mounting of one of the units in connection with a support illustrated, in part, in section.

FIG. 2 is a diagrammatic side view of the structure shown in FIG. 1 omitting the support, with parts of the structure broken away and part of the construction shown in section, and FIG. 3 is an enlarged partial section on the line 3—3 of FIG. 2, with parts of the construction shown in elevation and diagrammatically illustrating the light source and photocell of the device.

In illustrating one adaptation of my invention, I employ what may be said to define two units 10 and 11, these units being suitably fixed to parts of any type and kind of machine depending upon the use to which the device is put, one of the units being fixed to a movable part of the machine and the other to a stationary part.

Again, in illustrating one adaptation, the unit 11 may be said to be attached to a movable part and a support portion of such movable part is indicated, in section, at 12 in FIG. 1 of the drawing; thus, in the present illustration, the unit 11 will be movable longitudinally with respect to the unit 10.

The unit 10 comprises suitably spaced bearing blocks 13 and 14 illustrated, in part, in FIGS. 1 and 2 of the drawing. The spacing of these blocks will determine substantially the length of the operation control element 15 employed and this element will vary in length, depending upon the nature of work or operations to be performed.

The element 15, in the construction shown, comprise an elongated strip of suitable transparent material, such, for example, as glass, having an opaque coating of black or other color on the undersurface thereof and this coating is marked at spaced intervals by transverse fine scratch lines or uncoated areas, which may be said to comprise translucent areas. The position of one of these lines on the element 15 is indicated by the unsectioned area of 15 at 15′ in FIG. 2 of the drawing; whereas, another spaced marking is diagrammatically illustrated by the transverse dot-dash line 15″ in FIG. 1 of the drawing. It will be understood that these marked or clear areas on the element 15 may be spaced to suit any desired control in operation of the device, as more fully hereinafter set forth.

Mounted in the bearing blocks 13 and 14 are slidable shafts 16 and 17, respectively, supporting at their inner adjacent ends U-shaped clamps 18 and 19 adapted to receive and support end portions of the element 15, as clearly indicated in FIGS. 1 and 2 of the drawing.

At one side of each clamp 18 and 19 are element alinement pins 18′, 19′ engaged by one side edge of the element 15, as diagrammatically illustrated in FIG. 1 of the drawing. A pair of Allen screws 20, 21 are arranged in the clamps to operate upon fiber or other plates 22, 23 in the clamps in securing the ends of 15 in the clamps, thus avoiding destruction to the element 15, particularly when composed of glass.

The shaft 16 is freely slidable in the block 13; whereas, fixed to the shaft 17 is a cross pin 24 operating in grooved sides 25 in the block 14, coil springs 26 being coupled with the ends of the pin 24 and with other headed members 27 fixed to the opposed end portion of the block 14. These springs normally urge the shaft 17 in engagement with the inner plunger end, not shown, of a standard-type of micrometer, diagrammatically illustrated, in part, at 28 in FIG. 1 of the drawing. The micrometer 28 is used primarily in initially setting the position of the element 15. In one adjustment of the micrometer, the shaft 17 is moved outwardly or to the left, as shown in FIG. 1; whereas, in the other adjustment, the springs 26 will move the shaft 17 to the right. It will be understood that, in movements imparted to the shaft 17, the shaft 16 will slide freely in the block 13.

Turning now to the unit 11, this unit comprises a back or supporting plate 29, note FIG. 3 of the drawing, to the face of which are secured upper and lower blocks 30, 31. In mounting of the blocks 30 and 31 on the plate 29, suitable means is provided to bring the bores 32 and 33 of the blocks 30, 31 in vertical registering alinement, as will appear from a consideration of FIGS. 2 and 3 of the drawing.

The bore 32 has, at its upper end, an enlarged chamber 34, in which a light source bulb 35 of any type or kind is arranged, the bulb shank portion being adjustably secured in a clamp 36 secured to the upper surface of the block 30.

The bore 33 of the block 31 opens into an enlarged chamber 37, in which is supported a photocell, diagrammatically illustrated at 38 in FIG. 3 of the drawing. The photocell is supported on the block 31 by a crossplate of insulating material 39 fixed to the lower surface of the block 31.

In fixing the blocks 30, 31 to the plate 29, the lower surface 40 of the block 30 is spaced sufficiently from the upper surface 41 of the block 31 to provide free passage of the element 15 between the surfaces 40, 41. This spacing is exaggerated in the showings in FIGS. 2 and 3 of the drawing for simplification.

The upper surface 41 has a dovetailed socket 42 extending therethrough and opening through sides of the block 31 and supported in said socket is a registration panel 43, having side edges conforming to the contour of the socket, as clearly illustrated in FIG. 3 of the drawing. The upper surface of the panel 43 also includes an opaque coating, which is either marked or uncoated transversely on a central portion thereof and this position has also been diagrammatically illustrated by the unsectioned portion of 43 at 43′ in FIG. 2 of the drawing so that, in FIG. 2, the marked or translucently clear passages 15′ and 43′ are shown in registering alinement, at which position the photocell 38 will be actuated.

From the foregoing, it will be apparent that the panel 43 is composed of transparent material and like the element 15 can be composed of glass and, in order to fix the marking 43' centrally with respect to the bore 33, a set screw 44 is employed to positively fix the panel 43 in the desired position.

In FIG. 3 of the drawing, the registering markings 15', 43' are diagrammatically illustrated by the dotted lines 15', 43' transversing 15 and 43. These dotted line markings are, of course, exaggerated, as the uncoated surface of 15 and 43 would be substantially unmeasurable, except on an extremely large scale.

In FIG. 3, I have illustrated at 45 the screws for mounting the block 30 in connection with the plate 29, Allen head type of screws being preferably employed. A pair of similar screws are used for supporting the block 31 in connection with the plate 29 and one of these screws is indicated at 45' in FIG. 3. Arranged centrally between the screws 45' is an alinement pin 46 for definitely alining the block 31 on the plate 29.

Also supported in the plate 29 is a bolt 47, note FIG. 1, for attachment of the unit 11 to the support 12, the head 48 of the bolt being preferably arranged in a recess 49 in an offset or ribbed part 50 of the support 29.

By employing control elements, such as the element 15, in many instances, these elements can be stored and used from time to time in performing corresponding operations on workpieces produced at widely spaced periods of time. It will, thus, be apparent that in shops of many types and kinds, a large number of these elements can be racked and stored for repeated use. Initially, however, each element will be pre-formed with a definite and predetermined arrangement of the markings 15, 15" thereon and, depending upon the length of the element 15, a relatively large number of these markings can be employed.

In the use as heretofore given by way of illustration, the unit 10 will be suitably supported on a machine with at least one of the markings on the element 15 in predetermined position with respect to a workpiece supported on the machine so that, in movement of the unit 11, the tool moved with the unit 11 can be brought into the desired work stations controlled by the spacing of the markings as at 15', 15" on the element 15. When at such stations, the photocell will automatically be actuated and through known means the tool will be put into operation. Accordingly, the tool will be moved from position to position throughout the cycle of operations controlled by the element 15. As previously stated, the micrometer 28 can be utilized to properly fix the first marked station on the element 15 with respect to a predetermined position or the like on the workpiece. However, after initially setting the element 15, the remainder of the control markings thereon will automatically result in performance of the several operations at the spaced stations controlled by the spacing of the markings.

A device of the type and kind under consideration will have many practical uses beyond that given herein by way of illustration and, by virtue of the simplicity of the structure in the complete device, it will be apparent that the desired end result can be accomplished at a minimum cost.

It will be noted, from a consideration of FIG. 3 of the drawing, that the width of the element 15 is greater than the upper exposed surface of the panel 43 so that side edges of the element 15 actually bear upon the surface 41. By reason of this construction, a slight clearance can be provided between 15 and 43, preventing the coated surfaces of the element 15 and panel 43 from coming into direct contact with each other. However, no attempt is made to show this slight clearance.

Having fully described my invention, what I claim as new and desire to secure by Letters Patent is:

1. A device of the character described comprising two units, one of which is movable longitudinally with respect to the other, one unit comprising spaced bearings, U-shaped clamps slidably engaging said bearings, an elongated control element coupled with and spacing said clamps, means controlling the position of one of the clamps with respect to its bearing, said element having translucent markings spaced longitudinally thereof, the other unit comprising a pair of spaced blocks, said blocks having alined bores, and one block supporting a light source registering with the bore of said block, the other block supporting a photocell in registration with the bore of said second block, a translucent marked panel supported in the second named block with a translucent marking in registration with the bore of the second named block, and said element being positioned between adjacent surfaces of said blocks for registration of the translucent markings of said element with the translucent marking of said panel.

2. A device as defined in claim 1, wherein said first named means comprises a micrometer positively moving the associated clamp in one direction.

3. A device as defined in claim 2, wherein means is employed for moving the last named clamp in positive engagement with said micrometer.

4. A device as defined in claim 1, wherein said element is of greater width than the exposed surface of said panel for direct support of the element upon the surface of the block supporting said panel.

5. A device as defined in claim 1, wherein means is employed for adjustably positioning the panel in its supporting block.

6. A device as defined in claim 1, wherein said clamps includes means for definitely fixing ends of said element in said clamps.

7. A device as defined in claim 1, wherein the second named unit includes a plate supporting said spaced blocks, and said plate having means for mounting the second named unit in connection with a support.

8. A device as defined in claim 1, wherein the first named block includes a clamp for adjustably supporting a light source.

9. A device of the character described, comprising an element having spaced translucent control markings thereon, means for adjustably supporting said element, means supporting a panel having a translucent marking thereon, said element and panel being movable one relatively to the other in bringing the markings of said element and panel in registration with respect to each other, said panel supporting means having a light source and photocell in registration with the translucent marking on said panel, and the adjustment of said element including a micrometer positively moving the element in one direction.

10. A device of the character described, comprising an element having spaced translucent control markings thereon, means for adjustably supporting said element, means supporting a panel having a translucent marking thereon, said element and panel being movable one relatively to the other in bringing the markings of said element and panel in registration with respect to each other, said panel supporting means having a light source and photocell in registration with the translucent marking on said panel, the adjustment of said element including a micrometer positively moving the element in one direction, and tensional means for moving said element into engagement with said micrometer.

References Cited in the file of this patent

UNITED STATES PATENTS

| | | |
|---|---|---|
| 2,122,818 | Ladrach | July 5, 1938 |
| 2,141,175 | Dawson | Dec. 27, 1938 |
| 2,311,142 | Turrettini | Feb. 16, 1943 |
| 2,351,955 | Graf | June 20, 1944 |
| 2,596,752 | Williams | May 13, 1952 |